Patented Aug. 23, 1949

2,479,762

UNITED STATES PATENT OFFICE 2,479,762

CORROSION PREVENTING COMPOSITION AND METHOD OF APPLYING

Lloyd C. Morris, Bartlesville, Okla., assignor to Phillips Petroleum Company, a corporation of Delaware No Drawing. Application May 24, 1946,
Serial No. 672,171

7 Claims. (Cl. 117—6)

This invention relates to the prevention of corrosion of metallic surfaces. In one of its aspects it relates to a composition of matter which may be adapted to be applied to metallic surfaces to form thereon a tenaciously clinging film which prevents atmospheric corrosion and which may be readily removed when desired by solution in a paraffinic hydrocarbon liquid like kerosene. In another aspect the invention relates to a method of protecting metallic surfaces against corrosion for limited periods of time.

The protection of unpainted metal surfaces from rust, corrosion, pitting caused by oxidation, electrolytic activity, corrosive chemicals such as salt water or acid in the atmosphere, and the like, and corrosion resulting from exposure to the atmosphere is of great importance in agricultural and industrial operations. Of the numerous compositions heretofore developed for use in coating exposed metal surfaces to protect them against such corrosive deterioration, some comprise greases, waste oils, and the like, and give only limited protection. Many other materials which may have more promise as corrosion preventives are too costly to be of any practical value for general large-scale use.

The principal object of the present invention is to provide a method and composition for the prevention of corrosion of exposed metal surfaces. Another object is to prevent atmospheric corrosion of such surfaces. Another object is to prevent corrosion of such surfaces by salt spray, acid spray, and the like corrosive atmospheres encountered adjacent bodies of salt water or chemical operations. Another object is to provide a simple and economical method and composition for the prevention of corrosion of exposed metal surfaces. Another object is to provide the composition for the prevention of corrosion of exposed metal surfaces which may be made substantially or entirely from materials available in the petroleum industry. Another object is to provide a corrosion preventing composition of the foregoing type which is non-drying in the sense that it remains on the metal surface in a soft film which is soluble in paraffinic hydrocarbon liquids and tenaciously and adhesively clings to the metal surface and is readily removed therefrom by solution in a petroleum hydrocarbon solvent like kerosene or gasoline, for example, by simply rubbing with a cloth saturated with such a hydrocarbon.

Another object is to provide a corrosion preventing composition of the foregoing type which is easy to apply, sets readily to a protective film, gives a film which has lasting qualities and is easily removed, and is chemically inactive with respect to the metal being protected. Numerous other objects will more fully hereinafter appear.

I have now found that the polymeric substances obtained from the clay tower refining of cracked gasolines have valuable properties for inhibiting corrosive deterioration of metal surfaces such as results from exposure to the atmosphere. In the practice of my invention, I have found that these valuable inhibiting properties may be extended to a variety of useful applications by employing the said polymeric material as a base for the production of blends or compositions to provide corrosion preventives with such properties.

The polymeric materials employed in the present invention are produced in the clay treatment of cracked gasolines. In the cracking processes substantial amounts of undesirable unsaturates including diolefins and the like are formed. The presence of these substances leads to gum formation and other undesirable properties in the fuel. Their removal is usually accomplished by contacting the gasoline, either in the liquid or vapor phase, with fuller's earth or a similar material. The undesirable unsaturates are polymerized by this treatment and are removed as bottoms when the treated gasoline is fractionated.

The high-boiling liquid polymer obtained by the method just described usually has an API gravity at 60° F. of from 15 to 25, a Gardner-Holdt viscosity ranging from B to H, and a total solids content of from 60 to 70 per cent as determined by heating for three hours at about 225° F.

In its broader aspect, the present invention comprises the employment of clay tower polymers as coating materials for the prevention of corrosive deterioration in exposed metallic surfaces. The clay tower polymer may be employed per se, usually in homogeneous admixture with a minor proportion of a volatile aliphatic essentially paraffinic hydrocarbon liquid as a thinner and diluent. Examples of suitable hydrocarbon liquids are kerosene, light naphtha (for example having a boiling point ranging of from 200 to 400° F.), Stoddard solvent, etc. Stoddard's solvent is a well-known paraffinic hydrocarbon solvent and has a boiling point ranging from an initial point of not less than 300° F. to a final or end point of not over 410° F. Any other suitable volatile hydrocarbon solvent may be used to thin and extend the clay tower polymer.

However instead of using the clay tower polymer alone, I much prefer to use it as a base wherein suitable modifying agents are incorporated to produce corrosion preventives of particular types, lasting quality, adhesiveness, and the like. For example, I often prefer to formulate a composition comprising a major proportion of the clay tower polymer, a minor proportion of petrolatum and a minor proportion of a solvent or diluent such as described above. The petrolatum imparts a softening and plasticizing action which is particularly valuable in the preparation of the corrosion preventive compositions of the present invention.

It is often preferable to incorporate in the composition a minor proportion of a mineral lubricating oil, especially refined lubricating oils of the higher viscosities such as, for example, those having an SAE viscosity ranging from 40 to 70.

I have further found that the adhesive properties of the composition may be greatly improved by the incorporation of a minor proportion of a metal mercaptide. While the mercaptan from which the mercaptide is made may be primary or secondary, I often prefer to use tertiary mercaptides of mercaptans having from 8 to 20 carbon atoms per molecule. Lead mercaptides are preferred. An example of a mercaptide which has been found very satisfactory is tertiary dodecyl lead mercaptide. The amount of such a mercaptide will often range from 1 to 5 per cent by weight of the total composition.

The amount of solvent employed may be varied within wide limits. Generally it will be substantially less than the amount of clay tower polymer used. The amount of solvent should be such as to give the desired viscosity required for ease of application of the composition. For example, the composition may often contain about 30 per cent by weight of a suitable paraffinic hydrocarbon solvent such as Stoddard solvent. It is often preferred to formulate the composition so that it has a viscosity of from C to F on the Gardner-Holdt scale.

The proportions of the components of the composition may be varied within quite wide limits. Often I prefer to employ at least 75 per cent by weight of the clay tower polymer, from 3 to 20 per cent by weight of petrolatum, from 3 to 20 per cent by weight of mineral lubricating oil and a minor proportion of the solvent, such as to give a material having a viscosity of from C to F on the Gardner-Holdt scale.

When the clay tower polymer is employed without the incorporation of additives, some variation in the type of protection obtained results from the manner of preparation of the composition.

For example, by employing the total clay tower polymer, i. e., without fractionation, protective coatings of a relatively temporary nature are secured, useful for a period not to exceed a few months. By distilling off the lower boiling fractions, preferably under vacuum, from the clay tower polymer, there is obtained a resinous type of product which when applied in a volatile solvent such as light naphtha (boiling point 200 to 400° F.), provides an impervious, long-lasting film capable of protecting exposed metal surfaces over relatively long periods of time, say as long as twelve months.

The resin which is formed by the removal of the more volatile components from the liquid clay tower polymer has a softening point ranging from 140 to 150° F. (ring and ball method), a paraffin hydrocarbon solubility of substantially 100 per cent, and an acid number less than 1 mg. KOH per 100 grams resin.

When employed per se, i. e., without any additives except the solvent or diluent, the polymer composition has such advantages as ease of application, chemical inertness, resistance to ordinary abrasion, imperviousness to weather, relatively long life, very low cost and others. In this form it is applicable to the protection of unpainted surfaces where low cost and protection for relatively short periods, say less than one year, are primarily desired. However, improved films may be obtained by incorporation with the polymer, either as originally prepared or after removal of the more volatile components as described above, of small amounts of plasticizing material such as petrolatum, mineral lubricating oil and the like. In addition to the incorporation of petrolatum with or without mineral lubricating oil, I prefer to use a lead mercaptide in small amounts in the composition as described above. By the use of the modifiers and additive substances described above in the composition, specific properties not available in the polymer by itself are imparted and the resulting compositions may be used to protect metal surfaces for as long as five years.

Numerous substances are soluble in the liquefied clay tower polymer, and by the combination of specific properties from the added substances or substances with the valuable characteristics of the polymer, protective coatings of superior quality may be provided. Environmental conditions, metals concerned, types of surfaces and the like present a wide variety of specific requirements for corrosion preventive materials. For example, the protection of the machined surfaces of precision tools during indoor storage presents entirely different requirements from the protection of an agricultural implement subjected to out-of-doors exposure. Bearing surfaces ordinarily subjected to lubrication will obviously require different treatment from a pipe line or ventilating flue.

The lead mercaptide provides polar characteristics whereby improved clinging or adhesive qualities are obtained, together with improved lasting qualities. Instead of lead mercaptide, although much less preferably, in some cases there may be employed other materials such as heavy metal soaps, high in molecular weight organic acids, esters, waxes, or the like to provide the desired polar characteristics.

In some cases I may incorporate into the composition greases, certain asphaltic materials, highly modified GR–S (butadiene-styrene copolymer) and the like to provide softer, more soluble films which are often desirable because of greater ease of removal from the metal surface at the end of the period of time during which corrosion protection is desired.

A very important attribute of the composition of my invention is that it does not harden or oxidize extensively. Thus the film produced is substantially unoxidized and therefore remains primarily soluble in the solvent used for removal such as ordinary kerosene, gasoline, or the like. If the composition is appreciably oxidized its solubility in paraffin hydrocarbon solvents such as kerosene will be decreased, and its utility for the purpose at hand will be destroyed. The use of petrolatum, mineral lubricating oil, and lead mercaptide in the composition are additionally important because they inhibit the tendency of the clay tower polymer to oxidize or harden after application.

The composition of the present invention may be applied to the metal surface in any suitable manner as by dipping, brushing or spraying. Generally I prefer to apply it by dipping or brushing because these methods give a more impervious film. After application of the composition to the metal, the solvent is allowed to evaporate. The resulting film is allowed to remain in place as long as protection against corrosion is desired. At the end of this period the film is readily removed by a simple solution in a volatile aliphatic essentially paraffinic hydrocarbon liquid, usually kerosene or gasoline.

Following are a number of specific examples of the practice of my invention.

Example I

A corrosion preventive composition was prepared from a mixture of clay tower polymer, kerosene and tertiary dodecyl lead mercaptide. This mixture was blended with a plasticizing medium comprising crude petrolatum and refined lubricating oil. The composition of the material was as follows:

| | Wt. per cent |
|---|---|
| Clay tower polymer | 83 |
| Kerosene | 5 |
| Tert-dodecyl lead mercaptide | 2 |
| Crude petrolatum | 5 |
| Refined lubricating oil | 5 |

The mixture had the following properties:

| | |
|---|---|
| API gravity, 60° F. | 17.9 |
| Density, lb./gal. | 7.89 |
| Pour point, °F. | 35 |
| Viscosity, 75° F., Gardner-Holdt | E |
| Flash point, COC, °F. | 215 |

The composition thus prepared was brushed on steel plates which had previously been cleaned and dried. After exposure to the atmosphere until thoroughly dried a dark brown, glossy film was produced which formed an impervious coating on the surface of the metal. Removal of the film was readily accomplished with a cloth moistened with kerosene.

Example II

A corrosion preventive composition comprising the following ingredients was prepared:

| | Wt. per cent |
|---|---|
| Clay tower polymer | 85 |
| Kerosene | 5 |
| Crude petrolatum | 5 |
| Lubricating oil, SAE 70 | 5 |

The properties of the mixture were as follows:

| | |
|---|---|
| API gravity, 60° F. | 18.7 |
| Density, lb./gal. | 7.85 |
| Pour point, °F. | 0 |
| Viscosity, 75° F., Gardner-Holdt | D |
| Flash point, COC, °F. | 215 |

Test plates were sprayed with this composition. The material when dry produced a dark colored, glossy film which completely covered the metallic surface. Removal of the film was effected as in the previous example.

Example III

The more volatile components were removed from a sample of clay tower polymer to yield a resin having a softening point of about 150° F. A mixture containing 90 parts by weight of this resin and 10 parts crude petrolatum was then dissolved in sufficient Stoddard solvent to yield a final solution with a viscosity of "D" on the Gardner-Holdt scale. A film similar to that of Example I was formed when the material was applied to steel test plates.

Example IV

To a mixture prepared as in Example III two per cent by weight of tert-dodecyl lead mercaptide was added. When this composition was applied to metal test plates and dried, a coating similar to that produced in the previous examples was obtained. The dried film was readily removed with kerosene.

I claim:

1. A composition of matter adapted to application to metallic surfaces and to form thereon a tenaciously clinging film which prevents corrosion of the metallic surface and which may be readily removed when desired by solution in an aliphatic essentially paraffinic hydrocarbon liquid such as kerosene; said composition comprising not less than 75 per cent of clay tower polymers produced in the clay treatment of cracked gasolines and further characterized by having an API gravity at 60° F. of from 15 to 25, a Gardner-Holdt viscosity range from B to H, and a total solids content of from 60 to 70 per cent as determined by heating for 3 hours at about 225° F.; from about 3 to 20 per cent petrolatum; and a volatile aliphatic essentially paraffinic hydrocarbon liquid thinner; all being in homogeneous mixture.

2. A composition of matter adapted to application to metallic surfaces and to form thereon a tenaciously clinging film which prevents corrosion of the metallic surface and may be readily removed when desired by solution in an aliphatic essentially paraffinic hydrocarbon liquid such as kerosene; said composition comprising not less than 75 per cent of clay tower polymers produced in the clay treatment of cracked gasolines and further characterized by having an API gravity at 60° F. of from 15 to 25, a Gardner-Holdt viscosity range from B to H, and a total solids content of from 60 to 70 per cent as determined by heating for 3 hours at about 225° F.; from about 3 to 20 per cent petrolatum; about 5 per cent of mineral lubricating oil; and a volatile aliphatic essentially paraffinic hydrocarbon liquid thinner; all being in homogeneous mixture.

3. The method of protecting metallic surfaces against atmospheric corrosion for a limited time which comprises applying thereto a film of a non-drying composition comprising not less than 75 per cent of clay tower polymers produced in the clay treatment of cracked gasoline and characterized by having an API gravity at 60° F. of from 15 to 25, a Gardner-Holdt viscosity ranging from B to H, and a total solids content of from 60 to 70% as determined by heating for 3 hours at 225° F., from 3 to 20% of petrolatum, from 3 to 20% of mineral lubricating oil, and a volatile aliphatic essentially paraffinic hydrocarbon liquid thinner, all being in homogeneous admixture; allowing said thinner to evaporate leaving a tenaciously clinging paraffin hydrocarbon soluble substantially unoxidized film; allowing said film to remain in place while protection against corrosion is desired; and removing said film at the end of the period by solution in a volatile aliphatic essentially paraffinic hydrocarbon liquid.

4. A composition of matter adapted to application to metallic surfaces and to form thereon a tenaciously clinging film which prevents corrosion of the metallic surface and may be readily removed when desired by solution in an aliphatic essentially paraffinic hydrocarbon liquid such as kerosene; said composition comprising a polymer material produced in clay treatment of cracked gasolines further characterized by having an API gravity at 60° F. of from 15 to 25, a Gardner-Holdt viscosity from B to H, and a total solids content of from 60 to 70 per cent as determined by heating for 3 hours at about 225° F., and a lead mercaptide in a proportion of from 1 to 5 weight per cent of the total composition.

5. A composition of matter adapted to application to metallic surfaces and to form thereon a tenaciously clinging film which prevents corrosion of the metallic surface and which may be readily removed when desired by solution in an aliphatic essentially paraffinic hydrocarbon liquid such as kerosene, said composition comprising not less than 75 per cent of clay tower polymer produced in the clay treatment of cracked gasolines and further characterized by having an API gravity at 60° F. of from 15 to 25, a Gardner-Holdt viscosity range of B to H and a total solids content of from 60 to 70 per cent as determined by heating for 3 hours at about 225° F., from 3 to 20 weight per cent petrolatum, from 3 to 20 weight per cent of a mineral lubricating oil, from 1 to 5 weight per cent of the total composition of a lead mercaptide of a mercaptan having from 8 to 20 carbon atoms per molecule, and a volatile paraffinic hydrocarbon liquid thinner, all being in homogeneous solution.

6. A composition of matter adapted to application to metallic surfaces and to form thereon a tenaciously clinging film which prevents corrosion of the metallic surface and which may be readily removed by solution in an aliphatic essentially paraffinic hydrocarbon liquid such as kerosene; said composition comprising not less than 75 per cent of a residual resinous material produced by distillation under vacuum to remove the more volatile components from a clay tower polymer produced in the clay treatment of cracked gasoline and further characterized by having an API gravity at 60° F. of from 15 to 25, a Gardner-Holdt viscosity range from B to H, and a total solids content of from 60 to 70 per cent as determined by heating for 3 hours at about 225° F.; said residual resinous material having a softening point range of 140 to 160° F. (ring and ball method), a paraffin hydrocarbon solubility of 100 per cent, and an acid number below 1 mg. KOH per 100 grams residual resinous material; from 3-20 per cent by weight of petrolatum; and a volatile aliphatic essentially paraffinic hydrocarbon liquid thinner; all being in homogeneous mixture.

7. The method of protecting metallic surfaces against atmospheric corrosion which comprises applying thereto a film of a non-drying composition comprising not less than 75 per cent by weight of a polymeric material selected from the group consisting of clay tower polymer produced in the clay treatment of cracked gasoline and further characterized by having an API gravity at 60° F. of from 15 to 25, a Gardner-Holdt viscosity range from B to H, and a total solids content of from 60 to 70 per cent as determined by heating for 3 hours at about 225° F., and a fraction of said clay tower polymer consisting of a residual resinous material produced by the vacuum distillation of said clay tower polymer to remove the more volatile components, said residual resinous material having a softening point range from 140 to 160° F. (ring and ball method) a paraffin hydrocarbon solubility of 100 per cent, and an acid number less than 1 mg. KOH per 100 grams of said residual resinous material; and a volatile aliphatic essentially paraffin hydrocarbon liquid thinner; and allowing said thinner to evaporate leaving a tenaciously clinging paraffin hydrocarbon soluble substantially unoxidized film.

LLOYD C. MORRIS.

REFERENCES CITED

The following references are of record in the file of this patent:

UNITED STATES PATENTS

| Number | Name | Date |
| --- | --- | --- |
| 1,777,107 | Schade | Sept. 30, 1930 |
| 2,008,102 | Hyman | July 16, 1935 |
| 2,393,774 | Hoiberg | Jan. 29, 1946 |

Certificate of Correction

Patent No. 2,479,762 August 23, 1949

LLOYD C. MORRIS

It is hereby certified that error appears in the printed specification of the above numbered patent requiring correction as follows:

Column 3, line 71, for "150° F." read *160° F.*;

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*